Nov. 18, 1958   J. L. VANCIEL   2,860,907
MILK BOTTLE CARRIER
Filed Aug. 31, 1956
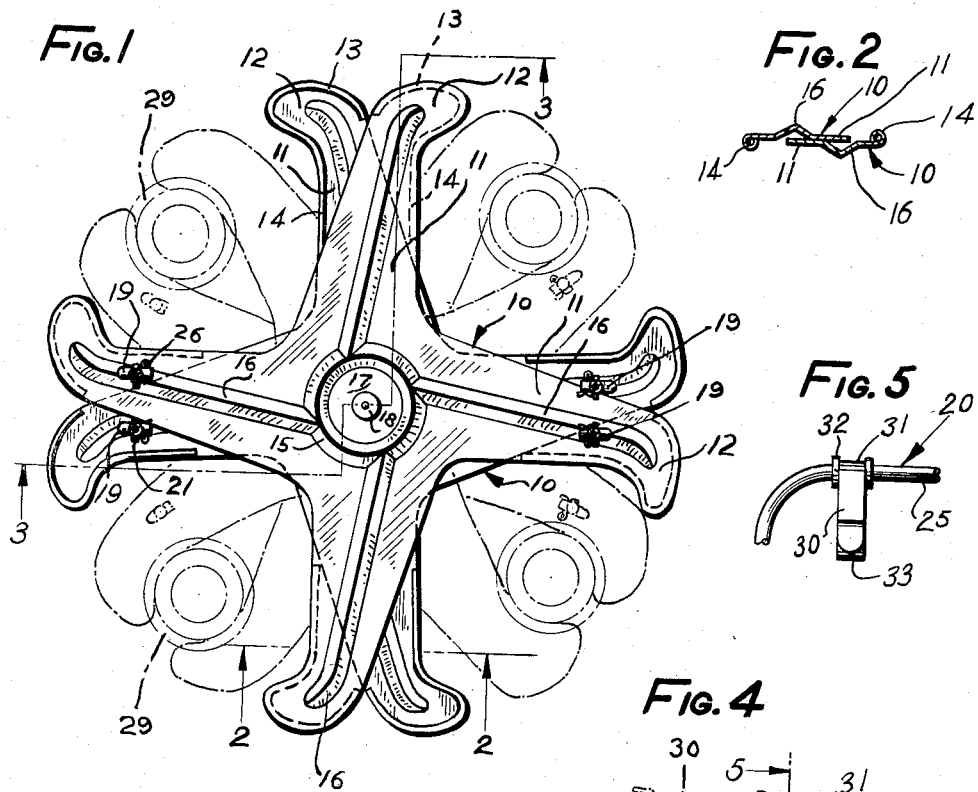
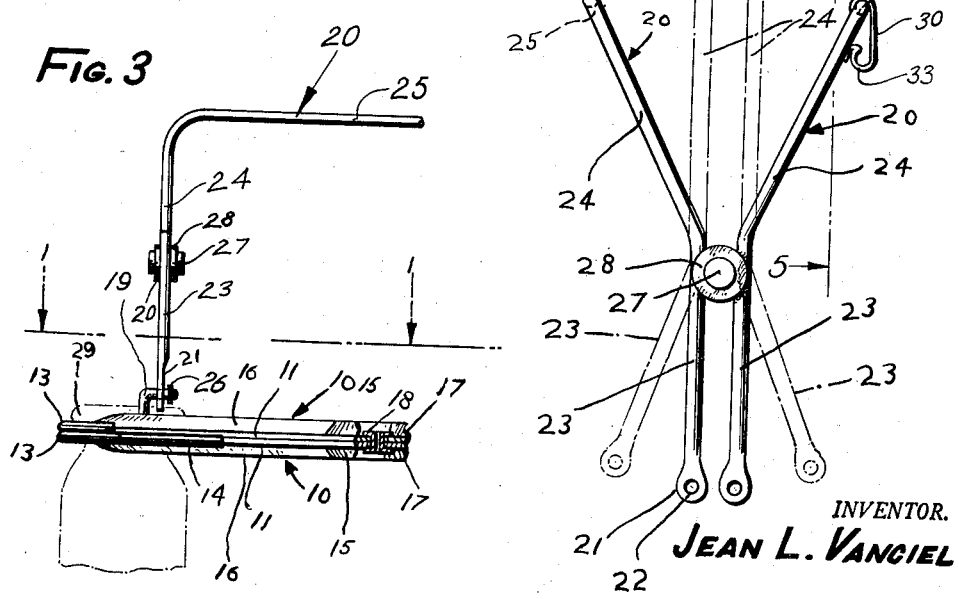
INVENTOR.
JEAN L. VANCIEL

United States Patent Office 2,860,907
Patented Nov. 18, 1958

2,860,907

MILK BOTTLE CARRIER

Jean L. Vanciel, Sacramento, Calif.

Application August 31, 1956, Serial No. 607,443

6 Claims. (Cl. 294—87.24)

This invention relates to milk bottle carriers.

It is an object of the present invention to provide a milk bottle carrier which will speed home milk delivery by eliminating extra handling of the bottles individually and wherein it is unnecessary to touch the bottles with the hands which keeps the bottles in a sanitary condition.

It is another object of the present invention to provide a milk bottle carrier of the above type which effects an economy of time by eliminating the necessity of warming the hands during cold weather and wherein the bottles are removed from the case more readily due to the eliminating of binding against the partitions in the case, wherein less noise is occasioned since the bottles are raised in spaced relationship to each other, and wherein as many as one to eight bottles may be carried at one time by the user.

Other objects of the invention are to provide a milk bottle carrier bearing the above objects in mind which is of simple construction, has a minimum number of parts, is inexpensive to manufacture and efficient in operation and use.

For other objects and for a better understanding of the invention, reference may be had to the following detailed description taken in connection with the accompanying drawing, in which:

Fig. 1 is a horizontal sectional view of a preferred embodiment of the present invention taken along the line 1—1 of Fig. 3;

Fig. 2 is a vertical sectional view taken along the line 2—2 of Fig. 1;

Fig. 3 is a side elevational view shown partly in section and looking along the line 3—3 of Fig. 1;

Fig. 4 is an end elevational view of the handles forming a part of the invention; and Fig. 5 is a fragmentary front elevational view looking along the line 5—5 of Fig. 4.

Referring now more in detail to the drawing, 10 indicates generally a pair of multi-armed plates, substantially as illustrated. Each of the plates 10 is identical in size and shape and therefore only one will be described in detail.

Each of the plates 10 includes the four equi-angularly spaced arms 11, the edges of which converge away from the center of the plate and terminate in the laterally bent curved portions 12. The edges of the curved portions 12 are rolled, as at 13, this rolled edge continuing along one of the edges of the arms, as at 14. Each of the plates 10 at the center thereof is stamped with the circular ridge 15 from which extend the radial raised ridges 16 for strengthening purposes.

As shown in Fig. 1, the plates 10 are reversed relative to each other, so that the curved end portions 12 thereof extend in opposite directions and the ridges 15 and 16 extend away from each other, while the flat central portions 17 thereof are pivotally connected together by means of the rivet 18.

Four L-shaped pins 19 are welded or otherwise secured to the upper surfaces of the four oppositely disposed arms 11 as shown in Fig. 1, two of the pins being welded to the upper plate 10 and the other two to the lowermost.

A pair of U-shaped handles of tubular stock indicated generally at 20 are formed at their free ends with the enlargements 21 having the openings 22 (Fig. 4) which receive therethrough the pins 19, each of the handles including the vertical portions 23 (normally vertical when the carrier is open) and the upwardly and outwardly extending portions 24 which are connected by the horizontal gripping portions 25. Cotter pins 26 retain the handles on the pins 19, as will be obvious.

The vertical portions 23 of the handles 20 at their upper ends are pivotally connected together about a fulcrum or pin 27 by means of the washers 28 which are alternately welded to opposite vertical portions 23. Thus the one washer 28 is welded to the vertical portion connected to the upper plate 10 while the inner washer 28 is welded to the vertical portion 23 connected to the lower plate.

In operation, upon squeezing the horizontal portions 25 of the handles 20 together, as shown in phantom in Fig. 4, the plates 10 will be moved in opposite directions to bring the arms 11 of the lower plate and the upper plate together about the neck of the milk bottle below the upper rim 29 (Fig. 1). The rolled edges 13 and 14 will cooperate to grip the milk bottles in closer alignment with each other.

The handles 20 of steel tube exert pressure against the support pins 19, thus returning the plates to the released position shown in full lines of Fig. 1 automatically. That is to say, that as the horizontal portions 25 of the handles are urged together from the location shown in full line to the position shown in outline in Figure 4, the adjacent lower vertical portions 23 are concurrently caused to spread, which also appears most clearly in Figure 4. As a consequence of this spreading action the corresponding adjacent arms of the plates are caused to move away from each other in an angular direction, as appears in Figure 1. Now, as this angular displacement of the arms takes place, the lower ends 21 of the vertical legs 23 of each of the inverted U-shaped handles are deformed inwardly toward each other. In other words, whereas the original or normal or undeformed positions of the two legs are approximately as shown by the locations of the pins 19 in Figure 1, the position when deformation has taken place is indicated by the two pins shown in outline and located adjacent the reference numerals 21 and 10, the distance between the pins when in deformed position being less than the distance between the pins in undeformed condition of the legs 23. The strain imposed on the legs 23 by the deformation tends to urge the legs outwardly and away from each other, with a consequent rotation of the two plates back into normal or original position. This eliminates the need for additional return springs.

In retaining the carrier in the closed position, a handle grip lock is provided operated by thumb or finger and comprises the flat strip 30, one end of which is formed with the looped portion 31 which is rotatably mounted on one of the horizontal handle portions 25 intermediate the retaining collars 32, the other end thereof being formed with the resilient hook shaped portion 33 adapted to snap on the other horizontal portion 25, as shown in phantom in Fig. 4. This permits the operator to set the bottles down while opening doors and pick the carrier up again quickly without any chance of upsetting the bottles. The handle grip lock 30 will swing with slight tension.

While various changes may be made in the detail construction, it shall be understood that such changes shall be within the spirit and scope of the present invention as defined by the appended claims.

What I claim as new and desire to protect by Letters Patent of the United States is:

1. A bottle carrier comprising a pair of multi-armed plates in face to face relation, each of said multi-armed plates having four equi-angularly spaced arms, the edges of which converge towards their outer ends, said arms at their outer ends being formed with laterally curved portions, said multi-armed plates being substantially the same in size and shape but reversed with respect to each other so that the curved end portions extend in opposite directions and are adapted to be brought together to grip a milk bottle neck below the upper lip thereof upon rotational movement of said plates, means pivotally connecting said plates together at their central portions, and handle means for supporting said plates and for rotating the same in the desired direction whereby to grip the neck of the milk bottle below the lip thereof, said handle means including a pair of oppositely disposed horizontal parallel gripping portions adapted to be brought together when the carrier is locked, each of said pair of horizontal portions being mounted on a pair of vertical portions, each of said pair of vertical portions including a first vertical portion pivotally mounted on one of said plates and a second vertical portion pivotally mounted on the other of said plates and releasable means for retaining said horizontal portions in the locked position.

2. A bottle carrier according to claim 1, said handle means comprising a pair of U-shaped handles the free ends of said handles being pivotally mounted on the outer portions of the corresponding oppositely disposed arms of each of said plates, each of said handles having substantially vertical lower end portions and upwardly and outwardly extending upper end portions connected by a horizontal portion adapted to be brought together whereby to move the adjacent arms of each of said plates away from each other, and means pivotally connecting the upper ends of the lower vertical end portions of said handles.

3. A bottle carrier according to claim 2, said means pivotally connecting the upper portions of the lower vertical end portions of the handles comprising washers welded to the lower vertical portions on the inner and outer faces thereof, one of said washers being welded to one of the lower vertical end portions and the other washer being welded to the other lower vertical end portions and pin means rotatably mounting said washers.

4. A bottle carrier according to claim 3, said means for releasably locking said handles in the closed position comprising a flat strip of spring metal having a loop at one end rotatably mounting the same on one of the horizontal portions of said handles, said strip at the other end being formed with a resilient hook-shaped portion adapted to engage the other horizontal portion when said horizontal portions are brought together and to retain the same together until released.

5. A bottle carrier according to claim 4, the curved ends of said arms having rolled edges, said rolled edges continuing along the adjacent edges of said arms whereby to grip the bottles in closer alignment with each other, each of said plates having a central upwardly stamped circular ridge, each of said arms having an upwardly stamped ridge extending therealong for strengthening purposes.

6. A bottle carrier comprising an upper plate having four substantially radial arms, a lower plate having four substantially radial arms pivotally mounted on said upper plate in face to face and coaxial relation thereto, the tips of said upper plate arms being curved in one angular direction, the tips of said lower plate arms being curved in the opposite angular direction, a first pin mounted on one arm of said upper plate, a second pin mounted on the opposite arm of said upper plate, a third pin mounted on one arm of said lower plate, said one arm of said upper plate being adjacent said one arm of said lower plate, and a fourth pin mounted on the opposite arm of said lower plate, a pair of inverted U-shaped handles, each having a pair of depending legs, one pair of said depending legs being pivotally mounted on said first pin and said fourth pin, the other pair of said depending legs being pivotally mounted on said second pin and said third pin, the adjacent ones of said depending legs being pinned together in pivotal relationship intermediate their upper ends and their lower ends, said lower ends being spread apart as said upper ends are urged together, said plates being concurrently rotatable in opposite directions as said lower ends urge said first pin and said fourth pin in an opposite approaching angular direction and said second pin and said third pin in an opposite approaching angular direction, the distance between said first pin and said fourth pin and the distance between said second pin and said third pin being simultaneously decreased in extent as said plates are so rotated.

References Cited in the file of this patent

UNITED STATES PATENTS

| | | |
|---|---|---|
| 561,831 | Steward | June 9, 1896 |
| 884,688 | Terry | Apr. 14, 1908 |
| 2,355,004 | McCullough | Aug. 1, 1944 |
| 2,709,937 | McVey | June 7, 1955 |